June 3, 1952 F. BELLINGHER 2,599,427
METHOD OF BUNDLING SPRING HARROW TINES
Filed May 26, 1951
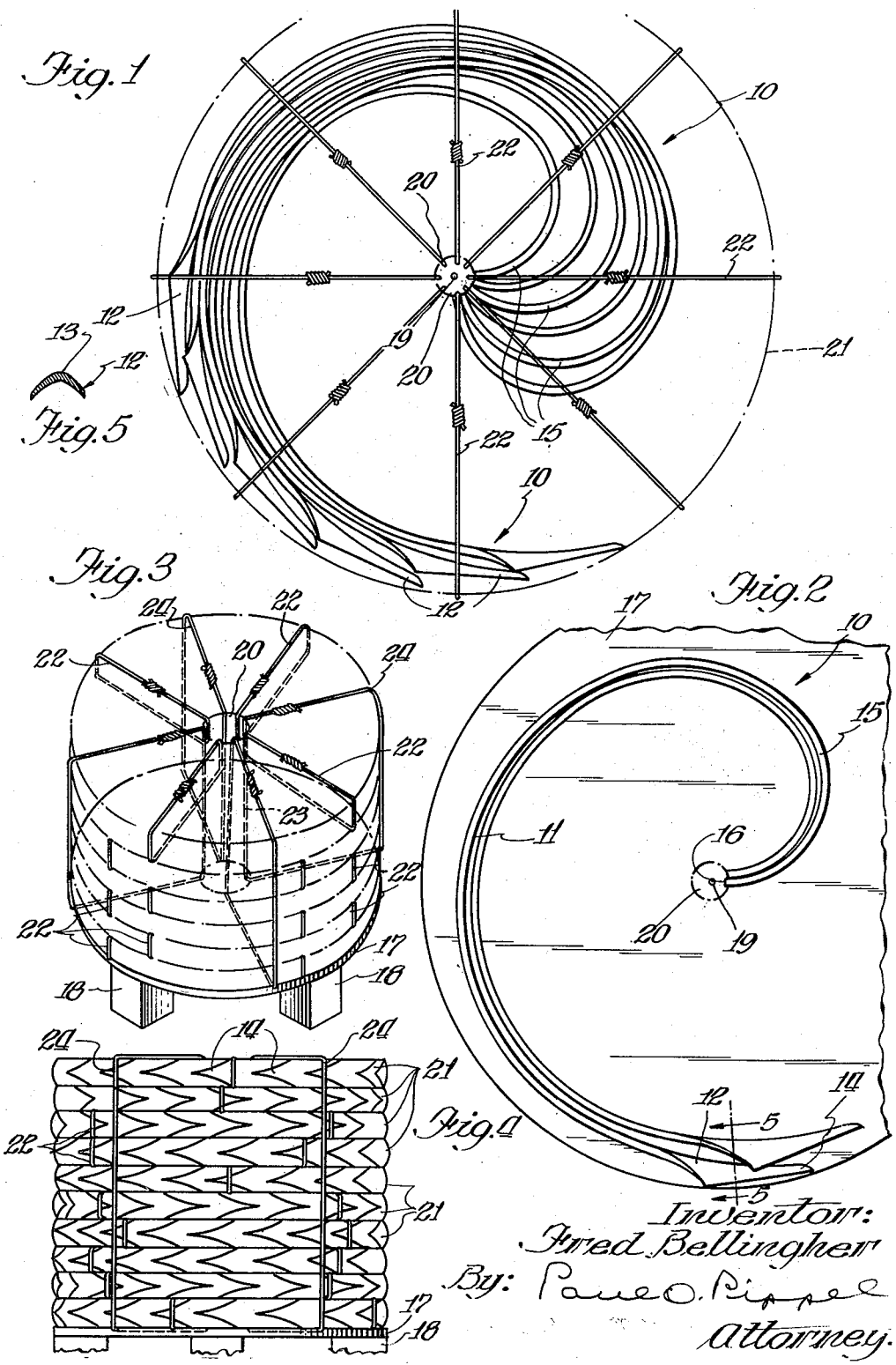
Inventor:
Fred Bellingher
By: Paul O. Pippel
Attorney.

Patented June 3, 1952

2,599,427

UNITED STATES PATENT OFFICE 2,599,427

METHOD OF BUNDLING SPRING HARROW TINES

Fred Bellingher, Chicago, Ill., assignor to International Harvester Company, a corporation of New Jersey Application May 26, 1951, Serial No. 228,509

7 Claims. (Cl. 100—31)

This invention relates to an improved method of bundling harrow tines. More specifically, the invention relates to a method of assembling harrow tines for shipment in stacks and bundles.

A spring tooth harrow generally consists of a number of individual tines which are connected to a beam in comb-like relation. These tines have to be replaced frequently as a result of wear and breakage. The problem of shipping replacement tines to various points of distribution has been considerable since it is quite difficult to package the tines in view of their uncommon shape. Harrow tines of the spring type generally consist of an arcuate body portion having at one end a connecting portion bent inwardly toward the arcuate body. The connecting portion is so termed since it is connected to the beam of a harrow. The other end of the arcuate body is provided with a tooth portion having a generally arcuate shape in cross section terminating in a point. The shape of the tine may be stated as being convolute in that the connecting portion extends in a direction opposite to the direction of extension of the tooth. In the past, harrow tines having these shapes have generally been shipped in enclosed boxes, this manner of shipment, of course, being quite expensive when considered with respect to freight rates and considering the cost of the boxes which seldom can be re-used. The tines, of course, can be shipped by merely placing the tines in piled fashion in a bunch and wiring the tines together. This type of packaging is undesirable since a relatively few tines occupy a great amount of space, and shipment in this manner is unsafe since the points of the tines project in various directions making handling extremely difficult.

It is a prime object of this invention therefore to provide an improved method for packaging and bunching spring-type tines for shipment.

It is a still further object to provide an improved method of shipping convolutely-shaped tines, the tines being nestled together in such a manner that they form a circular bundle, the bundle having strands of wire tied together for keeping the nestled tines in bunched relation.

A still further object is to provide an improved method of assembling convolutely-shaped tines, the method including the steps of positioning the tines in cradled relation with the points of the tines disposed in circumferentially spaced fashion to provide a bunched bundle having the teeth of the tines disposed about the periphery thereof.

Still another object is the provision of a plurality of steps defining an improved method of bundling harrow tines for shipment, the method including the steps of bundling convolutely shaped harrow tines into individual bundles and subsequently stacking them in superposed relation to form a stack tied together for shipment.

These and further objects will become more readily apparent from a reading of the specification taken in connection with the accompanying sheet of drawing, in which:

Figure 1 is a plan view showing a plurality of spring harrow tines positioned in cradled relation illustrating certain steps in an improved method for bundling harrow tines.

Figure 2 is a plan view of a pair of harrow tines disclosing certain steps in a bundling operation.

Figure 3 is a perspective view showing a plurality of bundled harrow tines positioned in superposed stacked relation ready for shipment.

Figure 4 is a side elevational view showing a stack of harrow tines bundled together ready for shipping purposes.

Figure 5 is a cross-sectional view through an arcuate tooth portion of a harrow tine, the view being taken substantially along the line 5—5 of Figure 2.

As best shown in Figures 1 and 2, a spring tooth tine 10 of the type to which this invention refers comprises essentially an arcuate body 11 having at one extremity a harrow tooth 12. The harrow tine may be stated as being of convolute shape. The harrow tooth 12 is of arcuate shape in cross section as indicated by the reference character 13 in Figure 5. The tooth 12 has its sides tapering to a point 14. The other extremity of the arcuate body 11 is provided with a connecting portion 15 terminating in an end 16. The connecting portion 15 is of curved shape with the end 16 being turned inwardly toward the arcuate body 11. The connecting portion 15 is usually provided with suitable connecting means for connecting the tines to a harrow beam in comb-like formation. In view of the convolute shape of the tines 10, the tooth 12 and the connecting portion 15 extend in opposite directions with respect to each other.

As best shown in Figures 2, 3 and 4, the tines 10 are positioned sideways on their edges on a flat circular board 17 suitably supported on blocks 18.

The method of assembling the tines 10 is as follows: A tine 10, as best shown in Figure 2, is disposed on its edge on the flat board 17. The end 16 is positioned substantially centrally on the board near a central point which is designated by 19. The person assembling the tines thereupon takes a second tine 10 which he positions in such a manner that the ends 16 are positioned in substantially contiguous or abutting relation. The connecting portions 15 are disposed to nest within each other and the tines are positioned together so that the arcuate body portions 11 are in substantially close or abutting nesting relation. Positioning of the tines is so arranged that the ends 16 are positioned in a circumferential manner to provide a circular opening as indicated at 20. Assembling of the tines 10 in this manner is so arranged to position the teeth 12 in a circumferentially spaced manner so that all of the teeth are positioned on the outside of the assembled bundle. The points 14 of the teeth are disposed as best shown in Figures 2 and 4 so that the teeth portion are nested or cradled substantially within the arcuate portions of the teeth 12. The tines 10 are thus positioned until the board 17 is completely filled with the tines forming a bundle of tines 21 which is at its outer periphery, substantially circular in shape and in plan view discloses a plurality of tines cradled together in generally convolute shape. Wire ties 22 are passed through the opening 20 and around the periphery of each bundle 21 to securely connect the tines in bundled relation. In view of the nesting or cradling relation of the convolutely shaped tines it can be seen that the bundles are firmly held together and that they can be easily transported and moved in this arrangement.

As best shown in Figures 3 and 4, the individual bundles 21 are stacked together in superposed relation on the board 17 with the circular openings 20 in aligned relation to form an elongated passage 23. Wire ties 24 are passed through the passage 23, these ties extending radially outwardly, and around the periphery of the stacked bundle, these ties securely bundling the bundles 21 in stacked relation. In this stacked relation the bundles of tines can be easily and expeditiously shipped.

It is believed clear that by this novel assembling method a great many convolute tines can be stacked within a relatively small space. The teeth of the tines are so arranged that they project outwardly only a limited degree and therefore the problems of handling are greatly minimized. With this type of arrangement it is unnecessary to ship the tines in boxes since they can be held together in bunched and stacked arrangement by the simple expedient of the wire ties shown.

It is believed that the objects of the invention have been fully achieved by this improved method, and it must be understood that changes and variations in the steps may be made without departing from the spirit of the invention nor the scope thereof as disclosed in the appended claims.

What is claimed is:

1. The method of bundling harrow tines, each tine having a generally similar convolute shape, including an arcuate body portion with a connecting portion at one extremity and a tooth portion at the other extremity extending in substantially opposite directions, the tooth portion having an arcuate shape in cross section terminating in a point; comprising the steps of, positioning the extreme ends of the connecting portions in abutting relation with the tines lying on their edges on a flat surface to form a circular opening substantially centrally disposed with respect to the assembled bundle, cradling the connecting portions in nesting arrangement, placing the arcuate body portions of the tines in substantially contiguous relation, positioning the points of the teeth in nesting arrangement with respect to the arcuate tooth portion of an adjacent tooth, whereby the plurality of tines are thus positioned in a generally convolute shape, with the points of all of the teeth disposed in circumferentially spaced arrangement about the periphery of the bundle to form a circularly shaped bundle, securing the tines in assembled relation by passing a plurality of first flexible tying elements through the circular opening and radially outwardly about the periphery of the bundle, and stacking a plurality of bundles in superposed relation with their center openings in registry to form a central passage, and securing the bundles in stack formation by passing a plurality of second flexible tying elements through the passage and around the outer periphery of the stack.

2. The method of bundling harrow tines, each tine having a generally similar convolute shape, including an arcuate body portion with a connecting portion at one extremity and a tooth portion at the other extremity extending in substantially opposite directions, the tooth portion having an arcuate shape in cross section terminating in a point, comprising the steps of, positioning the extreme ends of the connecting portions in abutting relation with the tines lying on their edges on a flat surface to form a circular opening substantially centrally disposed with respect to the assembled bundle, cradling the connecting portions in nesting arrangement, placing the arcuate body portions of the tines in substantially contiguous relation, positioning the points of the teeth in nesting arrangement with respect to the arcuate tooth portion of an adjacent tooth, whereby the plurality of tines are thus positioned in a generally convolute shape, with the points of all of the teeth disposed in circumferentially spaced arrangement about the periphery of the bundle to form a circularly shaped bundle, and securing the tines in assembled relation by passing a plurality of flexible tying elements through the circular opening and radially outwardly about the periphery of the bundle.

3. The method of bundling tines, each tine having a generally similar convolute shape including an arcuate body portion with a connecting portion at one extremity and a tooth portion at the other extremity extending in substantially opposite directions, the tooth portion having an arcuate shape in cross section terminating in a point, comprising the steps of, positioning the extreme ends of the connecting portions in abutting relation with the tines lying on their edges on a flat surface, cradling the connecting portions in nesting arrangement with respect to each other, placing the arcuate portions of the tines in substantially contiguous arrangement whereby the extreme ends of the connecting portions are positioned in circumferential relation to form a centrally disposed opening, positioning the teeth of the tines in circumferentially spaced relation whereby a plurality of tines are positioned in a generally convolute shape with the teeth of the tines disposed about the periphery of the bundle to form a circularly-shaped bundle, and securing the tines in this assembled relation by passing tying elements through the centrally disposed opening and around the periphery of the bundle.

4. The method of bundling tines, each tine having a generally similar convolute shape including an arcuate body portion with a connecting portion at one extremity and a tooth portion at the other extremity extending in substantially opposite directions, the tooth portion having an arcuate shape in cross section terminating in a point; comprising the steps of, positioning the extreme ends of the connecting portions in abutting relation with the tines lying on their edges on a flat surface, cradling the connecting portions in nesting arrangement with respect to each other, placing the arcuate portions of the tines in substantially contiguous arrangement whereby the extreme ends of the connecting portions are positioned in circumferential relation to form a centrally disposed opening, positioning the teeth of the tines in circumferentially spaced relation whereby a plurality of tines are positioned in a generally convolute shape with the teeth of the tines disposed about the periphery of the bundle to form a circularly-shaped bundle, and securing the tines in this assembled relation.

5. The method of bundling tines, each tine having a generally similar convolute shape including a body having a connecting portion at one extremity and a tooth portion at the other extremity extending in substantially opposite directions; comprising the steps of positioning the extreme ends of the connecting portions in substantially contiguous relation, cradling the connecting portions in nesting arrangements, placing the teeth portions in circumferentially spaced relation about the outer periphery of the bundle to form a bundle circular in shape, and tying said bundle for securing the tines in said relation.

6. The method of bundling tines, each tine having a generally similar convolute shape with a connecting portion at one end and a tooth portion at the other end, the connecting portion being curved in a direction opposite to the direction of extension of the tooth portion; comprising the steps of cradling the connecting portions, and positioning the teeth portions in circumferentially spaced relation to form a bundle circular in shape.

7. The method of bundling tines, each tine having a generally similar convolute shape with a connecting portion at one end and a tooth portion at the other end; comprising the steps of cradling the tines in close contiguous generally convolute arrangement whereby the teeth are circumferentially spaced to form a circularly shaped bundle and tying the tines in the bundled relation.

FRED BELLINGHER.

REFERENCES CITED

The following references are of record in the file of this patent:

UNITED STATES PATENTS

| Number | Name | Date |
|---|---|---|
| 1,160,203 | Scherer | Nov. 16, 1915 |
| 1,441,264 | Bruewer | Jan. 9, 1923 |
| 2,287,056 | Owens | June 23, 1942 |
| 2,571,748 | Newman | Oct. 16, 1951 |